United States Patent [19]

Yamashita

[11] 4,174,168
[45] Nov. 13, 1979

[54] SAFETY MECHANISM FOR CAMERAS

[75] Inventor: Maki Yamashita, Sakai, Japan

[73] Assignee: Minolta Camera Kabushiki Kaisha, Osaka, Japan

[21] Appl. No.: 856,143

[22] Filed: Nov. 30, 1977

[30] Foreign Application Priority Data

Dec. 3, 1976 [JP] Japan .................................. 51-145920
Dec. 10, 1976 [JP] Japan .................................. 51-148900

[51] Int. Cl.² ........................ G03B 17/38; G03B 17/42
[52] U.S. Cl. ........................................ 354/206; 354/207; 354/266
[58] Field of Search .................... 354/60 R, 204, 206, 354/212, 213, 234, 235, 266, 268, 207

[56] References Cited

U.S. PATENT DOCUMENTS

| 3,142,238 | 7/1964 | Hofmann et al. | 354/204 X |
| 3,590,710 | 7/1971 | Uno et al. | 354/235 X |
| 3,820,142 | 6/1974 | Beach | 354/206 |
| 3,878,546 | 4/1975 | Adamski | 354/206 X |

Primary Examiner—Michael L. Gellner
Attorney, Agent, or Firm—Wolder, Gross & Yavner

[57] ABSTRACT

A camera adapted to receive film perforated at predetermined metering intervals, is provided with electromagnetic shutter release means which includes switch means for preventing double exposure. The switch means permits shutter release operation when the camera is not loaded with film as well as when a fresh film frame is in registry with the camera exposure area. In preferred embodiments, the switch means may be operated by a film perforation sensing mechanism and/or film cartridge sensing means.

13 Claims, 14 Drawing Figures

SAFETY MECHANISM FOR CAMERAS

BACKGROUND OF THE INVENTION

The present invention relates generally to safety device for cameras, and more particularly pertains to an improved device for preventing double exposure to cameras which are adapted for use with film perforated at predetermined metering intervals.

Cameras are known in which a sensing pawl is moved a small amount by the camera loaded film after engaging a metering perforation in the film, to prevent further transportation of the film as well as to disable the double exposure prevention mechanism so that mechanical shutter release operation is allowed. It is also known with such cameras, as for example that is described in U.S. Pat. No. 3,820,142, that the double exposure prevention mechanism may be disabled when a film or film cartridge is not loaded in the camera so that the shutter may be operated without film for test purposes for the demonstration of the camera operation before customers.

Such cameras are usually of small size and light weight which is desirable for carrying purposes but which sometimes produces a blurred picture due to camera movement during the picture taking operation when the camera is supported by hand. Hence it is desirable if such cameras are provided with an electromagnetic shutter release device which requires a short stroke for the shutter release operation and reduces the possibility of blurred picture. The electromagnetic shutter release mechanism may serve as a battery checker if the power source battery for exposure control is also used for the mechanism.

SUMMARY OF THE INVENTION

Accordingly, a primary object of the present invention is to provide improved cameras which are adapted for use with film perforated at predetermined metering intervals, and which include electromagnetic shutter release means.

Another object of the present invention is to provide such cameras including the electromagnetic shutter release means which becomes operable when a film wind-up operation has been accomplished and when film is not loaded in the camera.

Still another object of the present invention is to provide an improved safety device for cameras which are adapted to receive film having one perforation per film frame and which include electromagnetic release means, said safety device preventing shutter release before the film is wound up or while the film is being wound up, but permitting the shutter release when film is not loaded in the camera.

A further object of the present invention is to provide an improved safety device for preventing the operation of an electromagnet for shutter release, in the incompletely advanced condition of a fresh film frame as well as in the absence of film in the camera adapted to receive film having one metering perforation per film frame.

Still a further object of the present invention is to provide a camera in which a sensing pawl is moved a small amount by film after falling into or engaging a perforation in the film to stop film transportation and enable the operation of the electromagnetic shutter release, with the sensing pawl being capable of detecting the absence of film to allow shutter release operation for test purposes.

Still a further object of the present invention is to provide a camera in which a sensing pawl when moved a small amount by film after falling into one of the perforations formed therein at predetermined intervals, disables the double exposure preventing mechanism which is also disabled in the absence of a film cartridge by a film cartridge detecting member.

The above and further objects and novel features of the invention will more fully appear from the following detailed description when the same is read in connection with the accompanying drawings. It is to be understood, however, that the drawings are for purpose of illustration only and are not intended as a definition of the limits of the invention.

DETAILED DESCRIPTION OF THE PREFERRED EMBODIMENTS

Figure 1:
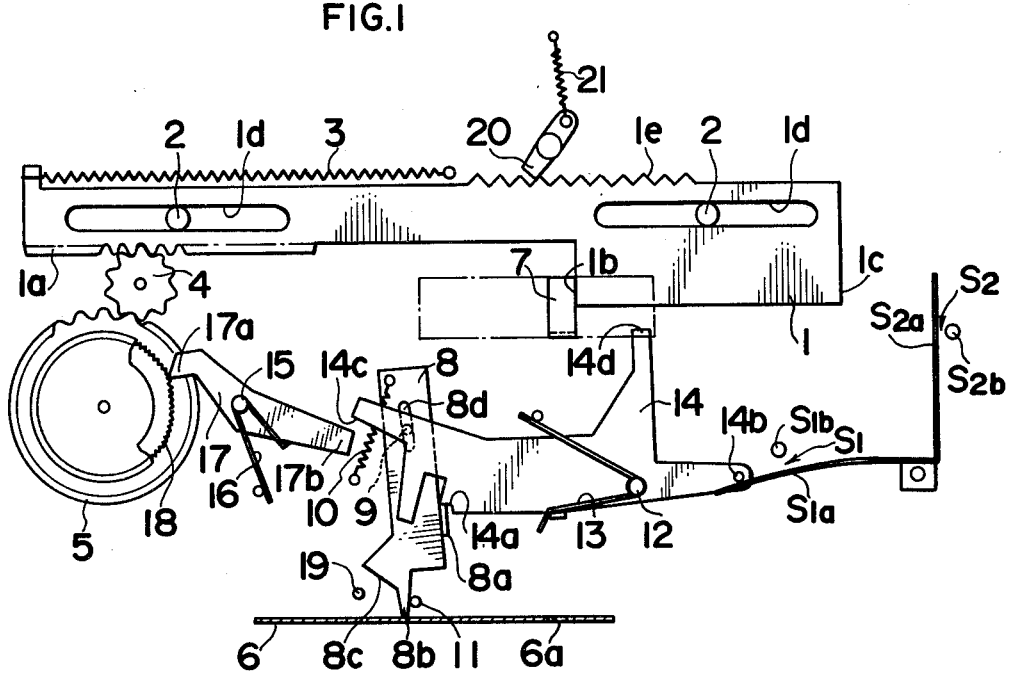
FIG. 1 is a plan view of an embodiment of the present invention shown in the condition with the film being transported.

Referring now to FIG. 1, a first and a second safety switch S1 and S2 have respectively movable contacts S1a and S2a mounted at each end thereof and are supported at a suitable portion of the camera, and fixed contacts S1b and S2b from which the movable contacts S1a and S2a are respectively retracted to open the switches S1 and S2.

An operating member 1 is formed with elongated slots 1d in which guide pins 2 fit respectively so that the operating member 1 is slidable in its longitudinal direction. Spring 3 urges the operating member 1 rightwards. The operating member 1 is also formed with a rack portion 1a engaged by a pinion 4 through which leftward movement of the operating member 1 rotates a gear 5 in a clockwise direction to advance or transport film 6 to the left with a shutter cocking member 7 being pushed by an edge 1b of a stepped portion of operating member 1 to the left to be cocked. Against the film 6 which is being transported leftwards by advance of operating member 1, rests a pawl 8b of a film sensing member 8 which is urged by a spring 10 downwards and counterclockwise with a guide pin 9 fitting in a slot 8d in the sensing member 8 and a pin 11 engages the sensing member 8 to prevent the counterclockwise rotation thereof. Thus, when a film metering perforation 6a in film 6 reaches the pawl 8b, the latter enters into the perforation so that the film 6 swings the pawl 8b to turn the sensing member 8 clockwise, as will be explained hereinafter.

Film sensing member 8 has a tab 8a engaging a step portion 14a of a control lever 14, which is pivotted on a fixed pin 12 and urged counterclockwise by a spring 13, so that the control lever 14 is prevented from rotating in a counterclockwise direction until released by the clockwise movement of sensing member 8.

Control lever 14, when restrained by the sensing member 8 as mentioned above, keeps switch S1 open by retracting, with its pin 14b, the movable contact S1a from the fixed contact S1b. Upon releasing of the restraint, the control lever 14 turns counterclockwise to allow the movable contact S1a to engage the fixed contact S1b and close the switch S1, with an operating portion 14c of the lever 14 pushing the end portion 17b of a clutch lever 17, which is pivotted on pin 15 and urged by spring 16 in a counterclockwise direction, and turning the lever 17 to disengage pawl portion 17a from and free clutch gear 18 so that the movement of operating member 1 may not be further transmitted to film 6 and the film may be stopped (see FIG. 2).

It is to be understood that the gear 5 and its related mechanism, although shown in detail may be so constructed, in the known manner, that the movement of operating member 1 is transmitted through pinion 4 and gear 5 to a film wind-up spool (not shown) to advance the film 6 when clutch gear 18 is restrained by clutch lever 17, and that the transmission is interrupted to stop the film transportation when clutch gear 18 is freed by disengagement of clutch lever 17 therefrom. The construction for these functions may be, for example, as shown in Japanese laid open patent application, published in 1974, with laying open No. 49-84434 and showing a mechanism wherein a planet gear pivoted on a rotatable lever corotatable with the gear 5 of the present mechanism is interposed between a sun gear, corotatable with the clutch gear 18, and a crown gear which is interconnected with the film spool through an intermediate idle gear whereby when the clutch gear 18 is restrained, the planet gear driven by the operating member 1, through pinion 4 and gear 5, rotates the crown gear to advance the film, but when the clutch gear 18 is freed, then the planet gear rotates the sun gear without rotating the crown gear, which requires more torque for its rotation to drive the film.

Figure 2:
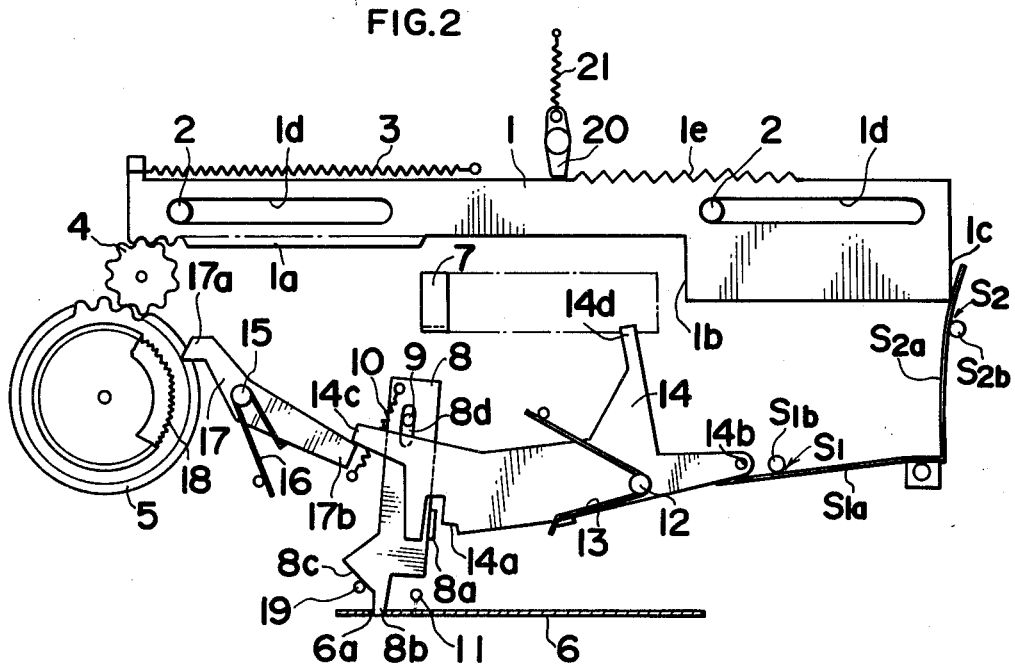
FIG. 2 is a view similar to FIG. 1 but shown in the condition with the film wound up and the shutter cocked.

When the operating member is freed or released by a camera operator after completion of the film transportation and shutter cocking, the member 1 returns to the right due to the force of spring 3 and advances movable contact S2a into contact with fixed contact S2b to close the switch S2 as shown in FIG. 2.

Figure 4:
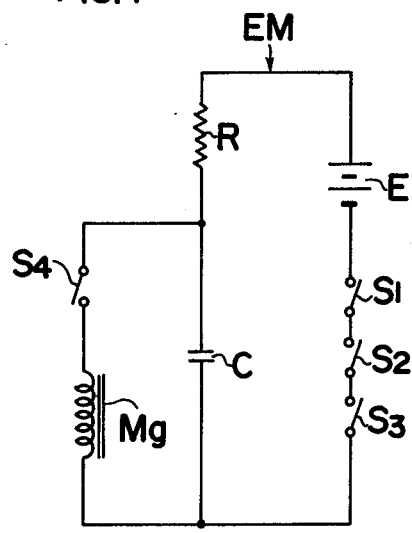
FIG. 4 is a circuit diagram of an electromagnet energizing circuit in accordance with the present invention.

Referring to FIG. 4, safety switches S1 and S2 are serially connected in the circuit of power source E, main switch S3, current limiting resistor R and capacitor C with a shutter release switch S4 and an electromagnet Mg for shutter release being connected in series across the capacitor C. The switches S3 and S4 are closed in response to the shutter release operation, e.g. the depression of a shutter release button (not shown), in the manner that the release switch S4 is closed a short time after the closure of the main switch S3. Thus, when the shutter release button is depressed after the completion of film transportation and shutter cocking accompanied by closure of switches S2 and S2, main switch S3 is first closed to charge capacitor C through switches S1, S2 and S3 and resistor R, and after a short time during which charging of the capacitor is completed, switch S4 is closed to energize the electromagnet by the discharge current from the capacitor and actuate the shutter mechanism (not shown).

When the shutter mechanism is actuated, the shutter cocking member returns to the right by means of a mechanism not shown but well known, and pushes a projection 14d of control lever 14 to turn the latter clockwise against the force of spring 13 so that clutch lever 17 is allowed to rotate counterclockwise by the force of spring 16 and bring pawl 17a into mesh engagement with clutch gear 18 to enable film transportation. At the same time, pin 14b carried by lever 14 pushes movable contact S1a away from fixed contact S1b to open the switch S1, thereby disabling shutter release operation of electromagnet Mg upon closure of switch S4.

Thereafter, if operating member 1 is operated to again advance the film, film sensing member 8, pawl 8b of which fits in a perforation 6a of film 6 (see FIG. 2), is rotated by the advancing film about pin 9 fitted in the slot 8d of the film sensing member 8 with the inclined portion 8c engaging reset pin 19 so that film sensing member 8 is moved upward by the reset pin 19 with its pawl 8b withdrawing from the perforation 6a and then the sensing member is rotated counterclockwise with the tip of pawl 8b sliding on the non-perforated portion of film 6 until stopped by pin 11 when tab 8a comes under step portion of control lever 14. Succeedingly, film 6 is advanced further with the pawl 8b resting against the film. In short, the film sensing member 8 is moved from the position shown in FIG. 2 to that shown in FIG. 1 at the initial stage of the film wind up operation.

Pawl member 20 urged by spring 21 to its neutral position, is engageable with toothed portion 1e of operating member 1 to prevent the latter from being moved backward by spring 3 upon the film wind up and shutter cocking operation until such operation is completed.

Figure 3:
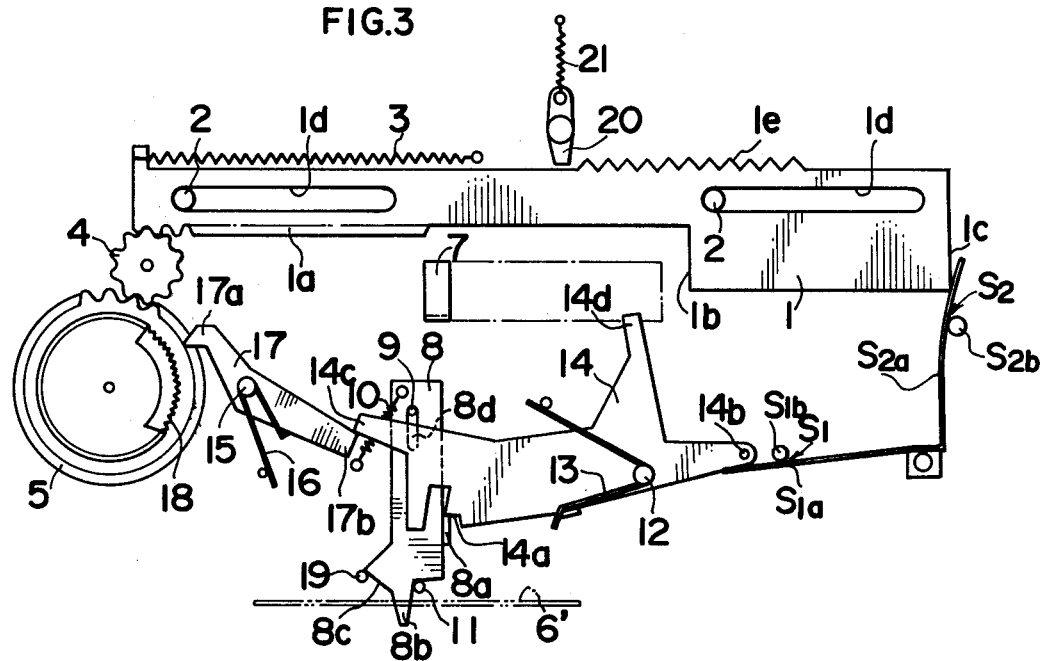
FIG. 3 is a view similar to FIGS. 1 and 2 but shown in the condition not loaded with film.

Referring now to FIG. 3, which shows the case when the camera is not loaded, film sensing member 8 occupies the lower position thereof, being urged by spring 10 and restricted by pins 11 and 19. Accordingly, control lever 14 under the action of spring 13, releases movable contact S1a to move toward fixed contact S1b to close the switch S1 and disengages pawl 17b from clutch gear 18 by the depression of the tail portion 17b, although the stepped portion 14a is in engagement with tab 8a of film sensing member 8. When operating member 1 is moved left-ward under the above condition, only the shutter cocking is effected with the transmission system between the film spool and the operating member 1 being interrupted. After completion of the shutter cocking or charging, the operating member 1 is allowed to return to its initial rest position as shown in FIG. 3 when the member closes switch S2 with its tail end portion. Accordingly, as both switches S1 and S2 are closed at this time, the electromagnet Mg can be energized by depressing the shutter release member to close switches S3 and S4 subsequently. Thus the shutter can be operated when the camera is not loaded with film or a film cartridge, as well as when a fresh film frame has been prepared for an exposure.

From the foregoing, it should be understood that the film sensing member occupies three positions in accordance with the camera condition. The first is occupied when the camera is not loaded as shown in FIG. 3, while the second is occupied when the film is being transported with the pawl of the sensing member resting against film surface as shown in FIG. 1. The sensing member is at the third position when the shutter has been cocked and film has been wound up or transported as shown in FIG. 2. Thus, the two serial switches S1 and S2 are both closed when the sensing member is at the first and third positions and opened at the second position so that non-film shutter operation is enabled with double exposure being still prevented.

Figure 5:
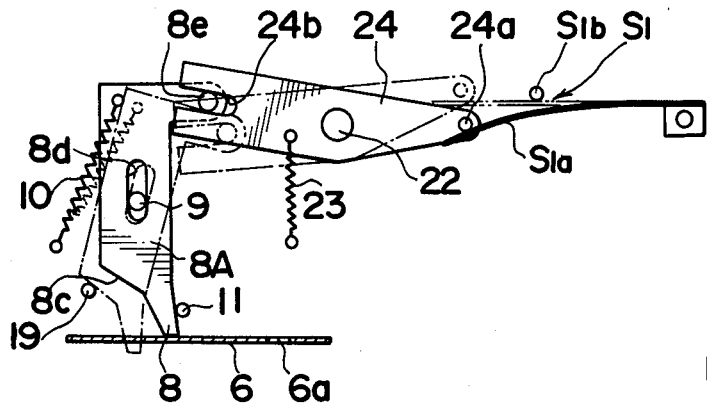
FIG. 5 is a partial plan view showing a modification of the structure of FIG. 1.
Figure 6:
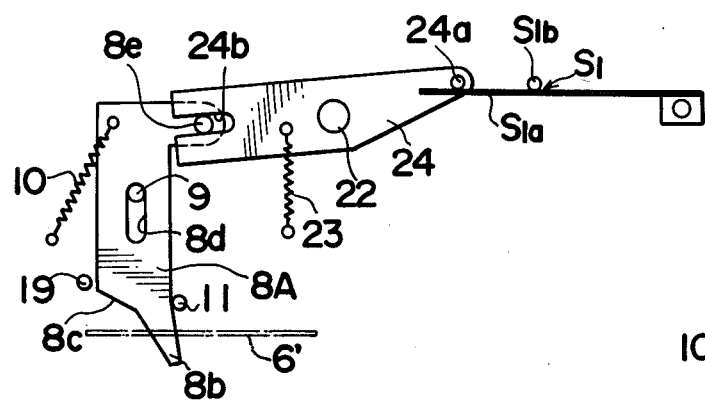
FIG. 6 is a view similar to FIG. 5 but in a condition in the absence of film.

FIGS. 5 and 6 show a modification of the switch control mechanism wherein the first safety switch S1 is actuated by a switch lever 24, which is pivoted by a pin 22 on the camera body and is urged by a spring 23 downward, in place of control lever 14. The switch lever 24 has a pin 24a carried thereby and is formed with a yoke end portion 24b. In the open slot of the yoke end portion 24b is fitted a pin 24a carried by a film sensing member 8A urged by spring 10 in the downward and counterclockwise direction and restricted by pin 11 with a pin 9 engaging a slot 8d in the film sensing member. Thus, switch S1 is opened and closed by the pin 24a in accordance with the position of the film sensing member.

In FIG. 5, the solid line illustrating switch lever 24 and film sensing member 8A shows the case when the camera is loaded with film and the film is on the way to being transported. In this case, film sensing member 8A, although being urged downward by spring 10, occupies the second position with its pawl 8b resting against the film surface so that movable contact S1a is retracted from fixed contact S1b through switch lever 24 to prevent unintentional exposure of film.

When film sensing member 8A is moved to the third position as shown by phantom line with the metering pawl 8b traversing the film through a perforation therein and having been moved by the film, the switch lever, following the film sensing member, turns counterclockwise and withdraws from the movable contact S1a to permit the closure of switch S1 and enable operation of the electromagnet.

In FIg. 6 showing the case when the camera is not loaded with film, not being restricted by the film, the film sensing member 8A moves down to the first position to rotate lever 24 counterclockwise to allow the movable contact S1a to engage fixed contact S1b and close the switch S1, thereby enabling the operation of the electromagnet without the presence of film.

Figure 7:
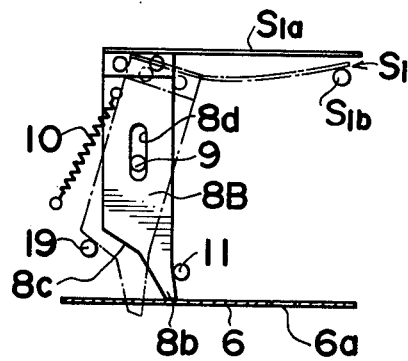
FIG. 7 is a partial plan view of another modification of the structure shown in FIG. 1.
Figure 8:
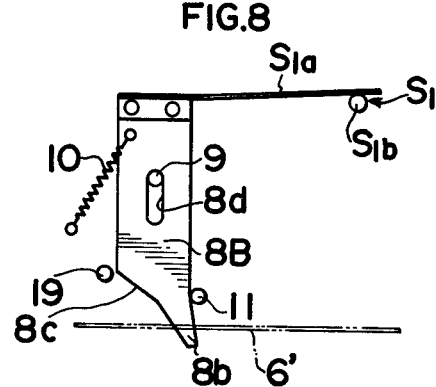
FIG. 8 is a view similar to FIG. 7 but in a condition in the absence of film.

FIGS. 7 and 8 show another embodiment of the switch control mechanism in which movable contact 11a is mounted on the film sensing member 8B. Accordingly, when the film sensing member 8B is at the second position with the film being in transportation as shown by solid line in FIG. 7, pawl 8b rests against the film surface to locate the member at the upper position thereof so that movable contact S1a is out of contact with fixed contact S1b to open the switch S1 thereby preventing exposure of film which is not sufficiently advanced.

On the other hand, when the film sensing member is at the position shown by phantom line in FIG. 7 wherein metering pawl 8b engages a perforation 6a in film 6 and the sensing member 8B has been rocked to the third position thereof, the movable contact S1a which is fixed to the sensing member at one end thereof, is brought into contact with fixed contact S1b to close the switch S1 thereby enabling the electromagnetic shutter release operation.

Further, when film is not present in the camera, the film sensing member 8B occupies the third position being restricted by pins 9 and 11 and urged downward by spring 10, thereby forcing the movable contact S1a into contact with the fixed contact S1b to close switch S1 so that shutter may be operated without film.

Referring next to FIGS. 9-12 which show another embodiment of the present invention in the condition when the shutter has been released, shutter cocking member 31 at the rest position thereof shown by real line in the Figure, engages driven partion 34e of control lever 34 which is pivotted by pin 32 located on a fixed portion of the camera body and urged by spring 33 in clockwise direction, and retains the control lever 34 at the first position thereof where pawl 34a is out of engagement with ratchet gear 35 and pin 34d carried thereby forces movable contact S1a of the first safety switch S1 away from the fixed contact S1b. Operating member 36 urged by spring 7 to the right, is also at the rest position thereof in FIG. 9 where the tail end portion 36e thereof forces the movable contact S2a of the second safety switch S2 into contact with the fixed contact S2b to close the switch S2.

A film cartridge detecting member 40 pivotally mounted on pin 38 and urged by spring 39 in a counterclockwise direction, is forced to turn clockwise by a film cartridge 41 upon insertion thereof, thereby retracting pin 40a carried on the detecting member 40, from movable contact S5a of the third safety switch S5 to allow the movable contact S5a to disengage fixed contact S5b.

Figure 13:
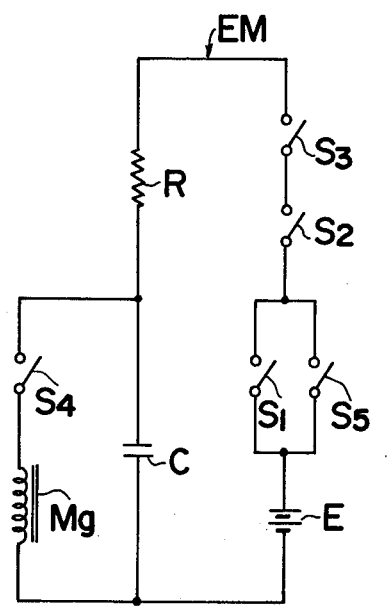
FIG. 13 is a circuit diagram of an electric circuit for energizing the shutter release magnet in cooperation with the mechanism shown in FIGS. 9 through 12.

The circuit shown in FIG. 13 is substantially the same as that of FIG. 4, but the third safety switch S5 is connected in parallel with the first safety switch S1. Thus, when the switch control mechanism is in the condition shown in FIG. 9, closure of the main switch can not close the charging circuit for the capacitor C because both first and third safety switches are open.

Transportation of film 42 in the cartridge 41 and charging or cocking of the shutter are effected by operating member 36 being moved to the left against the force of spring 37.

The leftward movement of the operating member 36 rotates a sector gear 43 counterclockwise, which engages rack 36a formed along the edge of the operating member 36, to rotate a film transport gear 48 clockwise and advance the film 42 to the left through a transmission which includes gear 47 rotatable coaxially with the sector gear 43 and engaged by a pawl 46 which is rockably mounted by a pin 44 on the sector gear 43 and urged by spring 45 to mesh the gear 47 for transmitting the movement of the sector gear 43 to the gear 47. The gear 47 is also engaged by a small gear 49 which is corotatable with ' the ratchet gear 35 so that the ratchet gear 35 rotates with the transportation of film 42 and restraint on the ratchet gear 35 stops the transportation. A leaf spring 50 engages the gear 47 to prevent the latter from moving reversely.

The leftward movement of the operating member 36 causes its operating arm 36b to engage shutter cocking member 31 to bring the latter from the position shown by solid line to the position shown by phantom line, thereby cocking the shutter simultaneously with film transportation. In the condition when the shutter has been released and before film is wound up (FIG. 9), sensing pawl 51a under the action of spring 52 traverses the film 42 through one of the perforations in the film.

Film metering member 51 is rockable and movable up and down, being supported through pin slot connection of fixed pin 53 and elongated slot 51b in member 51 and is urged by spring 56 in the downward and counterclockwise direction. On the fixed pin 53 is pivotally mounted an auxiliary member 55 which is urged by spring 54 in a counterclockwise direction and which is formed with a raised portion 55a and has a pin 55b carried thereon, with the raised portion 55a and the pin 55b being at the opposite side of the top of the metering member 51 so that the metering member 51 can slide therebetween relative to the auxiliary member 55 with the latter being capable of following the rocking movement of the metering member 51. In addition, a stop pin 56 is located in the path of auxiliary member 55 to restrict the counterclockwise movement of metering member 51 and auxiliary member 55 and to position the upper edge 55c of the auxiliary member 55 beneath a projection 34b of control lever 34 when the auxiliary member 55 bears against the pin 56.

Figure 9:
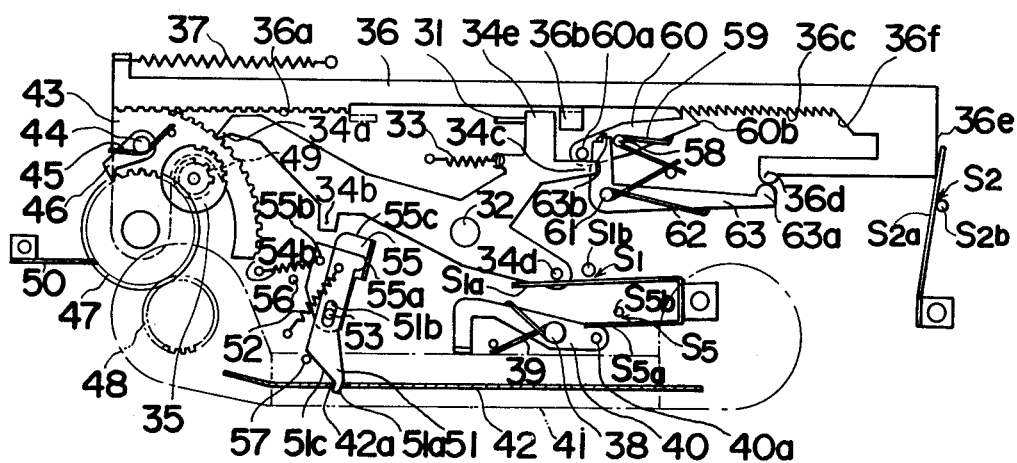
FIGS. 9 through 12 are plan views of another embodiment of the present invention, respectively in conditions when the shutter has been released, when the film is being transported, when film transportation has been accomplished, and when film is absent in the camera.
Figure 10:
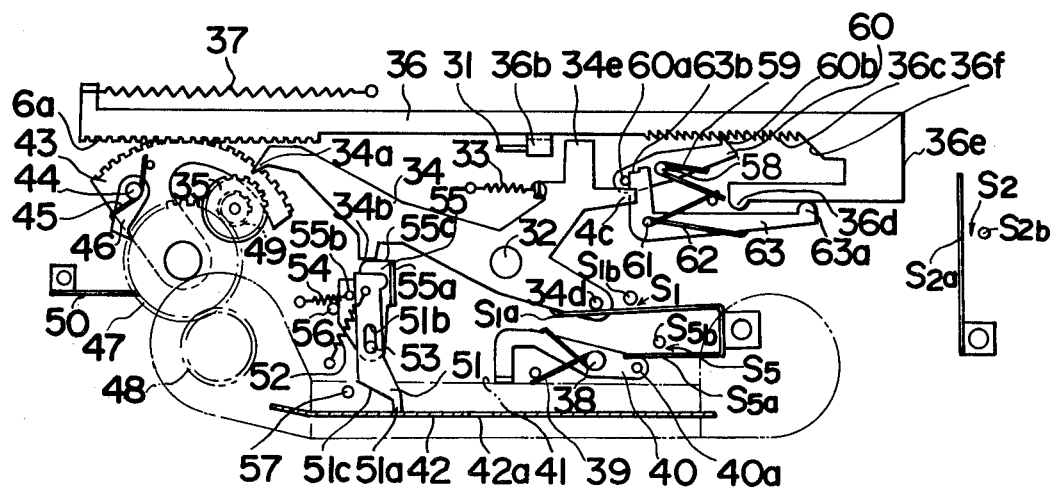

If the film transportation and shutter cocking operation is performed under the conditions shown in FIG. 9, metering member 51 whose sensing pawl 51a is in engagement with a film perforation 42a, is rocked at the initial stage of the operation by film 42 against the force of springs 52 and 54 together with auxiliary lever 55, with inclined edge 51C of the metering member 51 engaging reset pin 57 fixed on the camera body, to lift the metering member 51 and withdraw the sensing pawl 51a out of the perforation, thereby causing the metering member 51 to swing back with the auxiliary member 55 under the action of springs 52 and 54 until the metering member is stopped by pin 56. Thereafter, film 52 is further transported with sensing pawl 51a resting against the film.

In the meanwhile, as the operating member 36 is moved to the left with the film transporting and shutter cocking operation, shutter cocking member 31 is advanced by the operating member 36 to retract from driven portion 34e and release control lever 34, but the lever 34 is prevented from turning counterclockwise under the action of spring 33, due to the engagement of its projecting portion 34b with the upper edge of auxiliary member 55 which has come in the path of projecting portion 34b, whereby the movable contact S1a is kept off from the fixed contact S1b to open the first safety switch S1. It is to be understood here that operating portion 36b of the operating member 36 is so constructed as to engage the driven portion 34e after the operating member 36 travels a little distance whereby the upper edge of the auxiliary member 55 intercepts the projecting portion 34b before the shutter cocking member retracts from the driven portion.

When the film is advanced further and the next film perforation reaches the sensing pawl 51a, the pawl engages the perforation and metering member 51 and auxiliary member 55 are turned clockwise by the advancing film 42 against the force of springs 52 and 54 to release control lever 34 and allow it to rotate counterclockwise under the action of spring 33 thereby bringing the pawl 34a into engagement with ratchet gear 35 to interrupt the transmission of the movement of operating member to the film and stop the transportation thereof. At the same time, the counterclockwise movement of the control lever 34 retracts its pin 34d from the movable contact S1a to allow the latter to come into contact with the fixed contact S1b and close the switch S1.

The operating member 36 further has a toothed portion 36c engaged by a pawl member 60 which is pivotably mounted on a fixed pin 58 and urged counterclockwise by spring 59, so that the operating member is prevented from moving reversely while the member is in movement from right to left for the film transporting and shutter cocking operation. Upon completion of the film transporting and shutter cocking operation, control lever 34 turns counterclockwise, as explained above, so that the pawl member 60 is moved clockwise by an arm 34c of the control lever and disengaged from the toothed portion 36c to allow the reverse movement of the operating member 36. As a result, operating member 36 returns by the force of spring 37 rightward to its initial rest position where its tail end 36e brings movable contact S2a into engagement with fixed contact S2b to close the switch S2. It is to be understood that during backward i. e. rightward movement of the operating member 36, sector gear 43 is rotated clockwise with the pawl 46 on the sector gear 43 slipping over the teeth of gear 47, which is restrained by pawl 34a. Thus, switches S1 and S2 are closed with the completion of the shutter cocking and film wind-up operation, so that when shutter release button (not shown) is operated to close switch S3 at initial stage thereof, capacitor C is charged through switches S1, S2 and S3 and resistor R. After that when release switch S4 is closed by the shutter release button at the final stage of operation, capacitor C is discharged therethrough to energize electromagnetic Mg thereby actuating shutter mechanism not shown. 34a.

Figure 11:
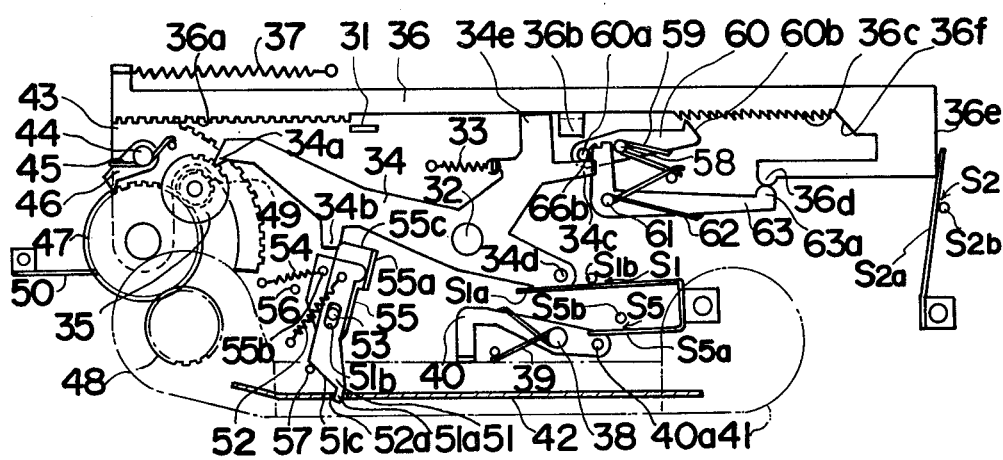

Upon actuation of the shutter mechanism, shutter cocking member 31 returns rightward from the shutter cocking position shown in FIG. 11 (shown by phantom line in FIG. 9) to the rest position shown by real line in FIG. 9 and engages driven portion 34e to cause control lever 34 to rotate in the clockwise direction whereby pawl 34a disengages from ratchet gear 35 to release restraint on gears 49, 47 and 48. At the same time, the clockwise movement of control lever 34 causes pin 34d to retract from movable contact S1a to permit the closure of switch S1, and allows pawl member 60 to be returned by spring 59 to the engaging position.

Thus, all the mechanisms of the present embodiment return to their initial position thereof shown in FIG. 9, thereby enabling again the film transportation and shutter cocking operation.

From the foregoing, it is to be understood that during the time from the actuation of the shutter mechanism to the completion of film transportation, at least one of the safety switches S1 and S2 is open with the switch S5 being kept open by the film cartridge as described hereinafter, electromagnet Mg is not energized even if the shutter button is inadvertently operated.

Figure 12:
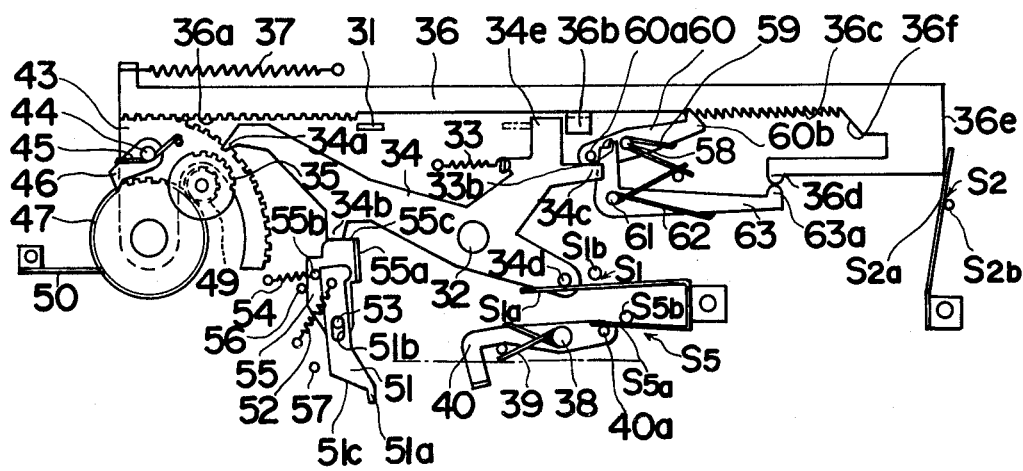

Referring now to FIG. 12 showing the case when the camera is not loaded with a film cartridge, the film metering member 51, not being intercepted by film, occupies the lower position thereof under the action of spring 52 with pin 53 being in contact with upper end of slot 51b. At this time, auxiliary member 55, being restricted by pin 56, regulates the attitude of film metering member 51 and prevents the counterclockwise rotation of control lever 34 by spring 33 by reason of its upper edge 25c engaging the bottom of projection 34b of control lever 34, so that the pawl 34a is out of engagement with ratchet gear 35 to allow the transmission to operate freely. Accordingly, leftward movement of operating member 36 only brings the shutter cocking member 31 to the cocked position thereof without affecting control lever 34 and film metering member 51, whereby the first safety switch S1 is kept open.

However, as a film cartridge is not loaded in the camera, cartridge sensing member 40 is rotated counterclockwise under the action of spring 39 whereby its pin 40a urges movable contact S5a to come into contact with fixed contact S5b and close the switch S5. Consequently, when operating member 34 returns to the initial rest position thereof after bringing shutter cocked member to the shutter cocking position, the charging circuit for capacitor C can be closed if main switch S3 is closed by operating the shutter release button, since the first safety switch S1 is shunted by switch S5 with the switch S2 being closed by the tail end of operating member 36. Thus, the shutter may be actuated without a film cartridge in the camera.

With this latter arrangement, in case of a film cartridge being absent in the camera, the pawl member 60 would not disengage from the toothed portion after the shutter cocking member 36 has been brought to the cocking position, since the control lever does not move in this case. To avoid this inconvenience, the mechanism of the embodiment is provided with an L-shaped lever 63 pivoted by pin 61 and urged by spring 62 in a counterclockwise direction, and the operating member 36 is provided with extension 36d and slant portion 36f. Thus, when the operating member 36 moves to the leftmost position, head of pawl member 60b is engaged by the slant portion 36f to be disengaged from the toothed portion. On the other hand, the L-shaped lever 63 which is restrained in FIG. 12 through engagement between projections 36d and 63a, turns counterclockwise as the operating member moves leftwards, so that the lever 63 bears against pin 60a carried by pawl member 60. As a result, when the pawl member 60 is turned clockwise by the slant portion 36f, the step portion 63b of the lever engages the pin 60a to restrain the pawl member away from the toothed portion 36c, so that the operating member 36 is allowed to return by the force of spring 37 even when the control lever 34 does not operate. When the operating member 36 reaches the initial rest position, L-shaped lever 63 is turned clockwise by engagement of projection 63a of the lever with the projection 36d to release the pawl member 60 and allow the same to return its engaging position. It is to be noted that although L-shaped lever 63 also operates even when the cartridge is loaded in the camera, this operation is redundant because the pawl 60 is controlled by the control member. From another point of view, it may be said that the arm 34c may be omitted by making the L-shaped lever 63 control the pawl member all the time.

Figure 14:
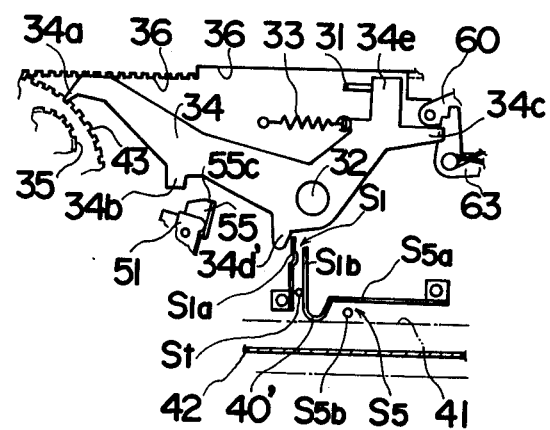
FIG. 14 is a partial plan view of a modification of the structure of FIGS. 9 through 12.

Referring now to FIG. 14, which shows a modification of the cartridge detecting mechanism in the embodiments of FIGS. 9 through 13, movable contact S5a of the third safety switch S5 is so formed as to detect a film cartridge by itself as well as to cooperate with movable contact S1a as an opposite contact thereof. The movable contact S5a is formed with a bulge 40' from which the movable contact S5a extends upward to oppose movable contact S1a. The control lever is further formed with a projection 34d' for controlling the movable contact S1a. A pin St fixed on camera body serves to restrict leftward movement of the movable contact S5a which is resiliently biased to move counterclockwise sliding by the pin St.

In the last described construction, when no cartridge is loaded in the camera, movable contact S5a moves by its elasticity downward to bring the bulge 40' into contact with fixed contact S5b for closing switch thereby enabling electromagnetic shutter release when switch S2 is closed by the operating member at the initial rest position thereof.

On the other hand, if the camera is loaded with a film cartridge 41, movable contact S5a is then pushed upward away from fixed contact S5b by the cartridge to open the switch S5. In this condition, if the film has not been transported for locating a new film frame in the exposure area of the camera, the circuit for the electromagnet shutter release can not be actuated, since the control lever is restrained, by auxiliary member 55, at the position shown in FIG. 10 due to the presence of film, with the projection 34d' being retracted from movable contact S1a to open switch S1. When the film is transported to turn metering member 51 clockwise by the film after pawl 51a falls into a film perforation, auxiliary member 55 also turns clockwise to release restraint of control lever 34, which turns counterclockwise for interrupting the film transportation with the projection 34d' engaging movable contact S1a to bring it into contact with the extension of movable contact S5a which serves as a fixed contact S1b' of the first safety switch S1. Thus, the switch S1 is closed to enable electromagnetic shutter release.

While preferred embodiments and their modifications have been described, such description is for illustrative purpose only, and it is to be understood that changes and variations may be made without departing from the spirit or scope of the following claims.

I claim:

1. A camera employing a film cartridge carrying film having longitudinally spaced frame indexing perforations, comprising:

a shutter actuating electromagnet;

means for sensing a film frame indexing perforation of the film from the film cartridge loaded in the camera and assuming a first condition when said perforation is in a predetermined position and assuming a second condition in the presence of the film cartridge in the camera with said indexing perforation spaced from said predetermined position in the direction opposite to the film advancing direction; and circuit means for energizing said electromagnet, transferable to alternative enabled and disabled states in response to the occurrence of said first and second conditions respectively and including selectively operable means for actuating said circuit means to energize said electromagnet when said circuit means is in said enabled state.

2. The camera of claim 1 including means for enabling said circuit means in response to the absence of a cartridge film in the camera.

3. The camera of claim 2 wherein said sensing means assumes a third condition in the absence of a film in said camera and said circuit is enabled in response to said third condition.

4. The camera of claim 3 wherein said circuit means includes a source of current, a first switch transferable between closed and open positions in response to said sensing means first and second conditions, a second switch transferable between open and closed positions in response to the advanced and retracted positions of said cocking member and a normally open selectively operable third switch defining said circuit actuating means, said current source and first, second and third switches being connected in series with said electromagnet.

5. The camera of claim 2 comprising cocking means movable between an advanced and retracted position for advancing the film and cocking the camera shutter, said circuit means being in a disabled state in response to said cocking means being in advance of its retracted position.

6. In a camera adapted for use with a film cartridge having a film with perforations at predetermined metering intervals, the combination comprising:
   electromagnetic means for shutter release;
   circuit means for energizing said electromagnetic means;
   first switch means for rendering said circuit means operable and nonoperable;
   film metering means resiliently abuttable on the film of the film cartridge loaded in the camera to engage one of said perforations of the film and movable to a first position when the film is being transported to a second position when the film has been transported a predetermined distance, and to a third position when the film is not present in the camera; and
   means for controlling said switch means in accordance with the positions of said film metering means so that said switch means renders said circuit means operable only when said film metering means is at said second and third positions, whereby said electromagnetic means is energizable when said metering means is at said second and third positions.

7. A camera as in claim 1, further comprising manually operable second switch means for rendering said circuit means operable when said film metering means is in said first position.

8. A camera as in claim 7, wherein said switch means includes a movable contact and fixed contact, and said means for controlling including means for interconnecting said movable contact with said film metering means.

9. A camera as in claim 8 wherein said movable contact is mounted on said film metering means.

10. A camera as in claim 8 further comprising an intermediate member for said interconnection between said film metering means and said movable contact, said first switch means being closed when said film metering means is at said second and third positions.

11. A camera as in claim 10 further comprising a shutter and a movable member movable to a cocked position when the shutter is cocked and to a rest position when the shutter is released, and means for rendering said first switch means nonoperable when said movable member is at said rest position thereof.

12. A camera as in claim 7 wherein said first switch means includes first and second switches connected in parallel with each other, and said means for controlling includes a control member for closing said first switch when said film metering member is at said second position, and further includes film cartridge detecting means for closing said second switch when the film cartridge is not loaded in the camera.

13. A camera as in claim 12 wherein said second switch includes a movable contact movable in accordance with whether film cartridge is loaded in the camera or not, thereby serving as said film cartridge detecting means.

* * * * *